J. P. MILLER.
ANTISLIPPING DEVICE FOR VEHICLE WHEELS.
APPLICATION FILED FEB. 11, 1915.
1,151,371.  Patented Aug. 24, 1915.
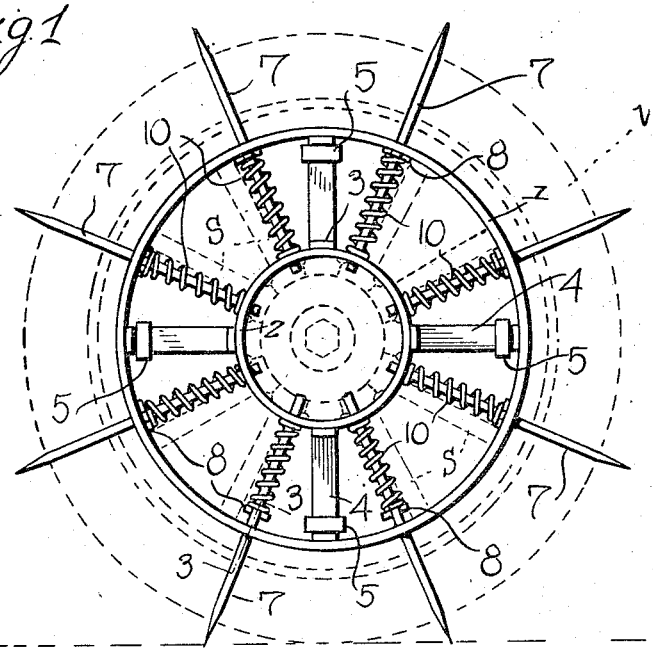
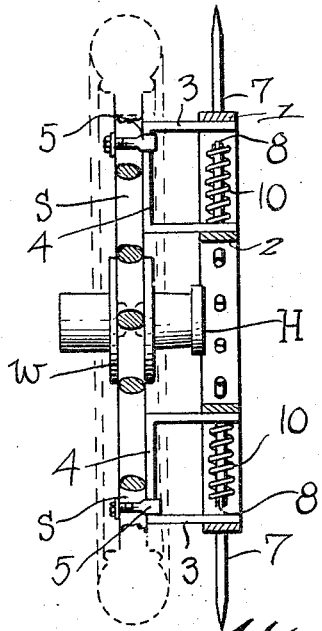
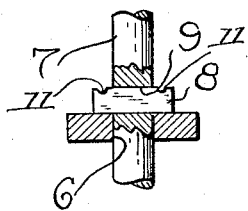
Inventor
J. P. MILLER

UNITED STATES PATENT OFFICE.

JOHN PERCY MILLER, OF BELLMORE, INDIANA.

ANTISLIPPING DEVICE FOR VEHICLE-WHEELS.

1,151,371.     Specification of Letters Patent.     Patented Aug. 24, 1915.

Application filed February 11, 1915. Serial No. 7,645.

*To all whom it may concern:*

Be it known that I, JOHN P. MILLER, a citizen of the United States, residing at Bellmore, in the county of Parke and State of Indiana, have invented certain new and useful Improvements in Antislipping Devices for Vehicle-Wheels, of which the following is a specification, reference being had to the accompanying drawings.

This invention relates to certain improvements in anti-slipping devices for vehicle wheels; and an object of the invention is to provide a device of this general character having novel and improved means whereby it may be operatively applied or removed from a wheel with convenience and facility.

It is also an object of the invention to provide a device of this general character comprising a plurality of radially movable members normally maintained at their limit of outward movement, and it is a still further object of my invention to provide, in combination with each of the radially movable members, a novel and improved stop device capable of detachable engagement therewith which serves to limit the outward or normal position of the member.

The invention consists in the details of construction and in the combination and arrangement of the several parts of my improved anti-slipping device for vehicle wheels whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in elevation of an antislipping device constructed in accordance with an embodiment of my invention in applied position, the coacting wheel structure being indicated by dotted lines; Fig. 2 is a sectional view of the device as disclosed in Fig. 1, a portion of the wheel structure being set forth in full lines; and Fig. 3 is a sectional view taken substantially on the line 3—3 of Fig. 1, with an adjacent portion of the wheel structure shown in full lines.

As disclosed in the accompanying drawings, 1 and 2 indicate concentrically disposed annular members arranged in predetermined spaced relation and connected at predetermined points by the substantially U-shape members 3, the base 4 of each of said members 3 being adapted to be detachably clamped with a spoke S of the wheel structure W. The clamp 5 may be of any preferred construction and for this reason it is thought that a detailed description and illustration thereof is unnecessary.

The annular members 1 and 2 are provided with the radially alined openings 6 through which are directed the elongated members 7 having their outer extremities pointed. These members 7 may be of any desired material but in practice I prefer to form the same of metal with a hardened core whereby the same will be substantially self-sharpening.

Each of the members 7 is adapted for free endwise movement and is of such a length as to normally project a predetermined distance beyond the periphery of the wheel structure W so that the same will effectively penetrate the surface over which such structure may be passing and thus effectively hold the same against slipping. As herein embodied, the outward movement of the member 7 is controlled by a key 8 loosely positioned within an opening 9 arranged transversely of the member 7 and at a predetermined distance inwardly of the pointed extremity thereof, said key being adapted to engage the inner face of the outer annular member 1. In order to normally maintain the member 7 at the limit of its outward movement, I interpose between the inner annular member 2 and the key 8 the expansible member 10, herein disclosed as a conventional coil spring, embracing or surrounding the member 7, and it is to be observed that the outermost convolution of the expansible member 10 is adapted to be received within the recesses 11 produced in the under face of each of the keys 8, whereby it will be perceived that the expansible member 10 also serves to maintain the key 8 in applied position yet will permit its withdrawal when desired with convenience and facility. It is also to be observed that the keys 8 are the only mediums for maintaining the members 7 in applied position, and when it is desired to remove one of said members 7, it is only necessary to displace its coacting key 8 whereupon said member may be readily withdrawn from engagement with the annular members 1 and 2.

It is also to be observed that the stems of the members 3 are of such a length as to position the members 1 and 2 to one side of the hub H of the wheel structure whereby said hub will offer no interference or obstruction to the inward movement of the members 7.

From the foregoing description, it is thought to be obvious than an anti-slipping device constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

An anti-slipping device for wheels comprising two concentric annular members, means for maintaining said members in predetermined spaced relation, said annular members being provided with radially alined openings, elongated members disposed through the alined openings of the annular members, a key loosely disposed through each of the elongated members and adapted to contact with one of the annular members for limiting the outward movement of said elongated member, said key being provided in its under face with recesses, and a coil spring surrounding each of the elongated members and interposed between the key and the inner annular member, said spring being disposed within the recesses of the key whereby said key is held against displacement, said spring serving to normally maintain the member at the limit of its outward movement.

In testimony whereof I hereunto affix my signature in the presence of two witnesses.

JOHN PERCY MILLER.

Witnesses:
MORTON OVERPECK,
ORA BLACKETER.

Copies of this patent may be obtained for five cents each, by addressing the "Commissioner of Patents, Washington, D. C."